United States Patent
Johnson

(10) Patent No.: US 9,278,479 B2
(45) Date of Patent: Mar. 8, 2016

(54) APPARATUS FOR LINEAR FRICTION WELDING

(71) Applicant: APCI, LLC, South Bend, IN (US)

(72) Inventor: Stephen A. Johnson, South Bend, IN (US)

(73) Assignee: APCI, LLC, South Bend, IN (US)

( * ) Notice: Subject to any disclaimer, the term of this patent is extended or adjusted under 35 U.S.C. 154(b) by 0 days.

(21) Appl. No.: 14/359,283

(22) PCT Filed: Dec. 5, 2012

(86) PCT No.: PCT/US2012/067940
§ 371 (c)(1),
(2) Date: May 19, 2014

(87) PCT Pub. No.: WO2013/085990
PCT Pub. Date: Jun. 13, 2013

(65) Prior Publication Data
US 2014/0326414 A1    Nov. 6, 2014

Related U.S. Application Data

(60) Provisional application No. 61/630,124, filed on Dec. 5, 2011.

(51) Int. Cl.
*B32B 37/00* (2006.01)
*B29C 65/06* (2006.01)
*B23K 20/12* (2006.01)

(52) U.S. Cl.
CPC ............. *B29C 65/0618* (2013.01); *B23K 20/12* (2013.01); *B23K 20/1205* (2013.01)

(58) Field of Classification Search
CPC .... B23K 20/1205; B23K 20/12; B29C 65/06; B29C 65/0618
USPC .......... 156/73.5, 73.6, 308.2, 580; 228/112.1, 228/2.1
See application file for complete search history.

(56) References Cited

U.S. PATENT DOCUMENTS

| | | | |
|---|---|---|---|
| 4,858,815 A | | 8/1989 | Roberts et al. |
| 5,248,077 A | | 9/1993 | Rhoades et al. |
| 5,464,498 A | * | 11/1995 | McGrath .................... 156/580.2 |
| 5,468,336 A | * | 11/1995 | Lotz et al. .................. 156/580.2 |
| 8,181,841 B2 | * | 5/2012 | Johnson et al. ................ 228/2.1 |
| 2006/0113358 A1 | | 6/2006 | Crasser |

FOREIGN PATENT DOCUMENTS

CH            540087 A       8/1973

OTHER PUBLICATIONS

Extended International Search Report corresponding to European Application No. 12855889.7, dated Aug. 20, 2015 (4 pages).

* cited by examiner

*Primary Examiner* — James Sells
(74) *Attorney, Agent, or Firm* — Maginot, Moore & Beck LLP

(57) ABSTRACT

The linear friction welding apparatus of this invention includes two vibrating assemblies, which simultaneously vibrate both work pieces along different weld axis within the plane of the weld interface during the weld process. The LFW apparatus allows one or both work pieces to be independently vibrated against one another along different weld axis to control and concentrate the application of thermal energy across the weld surfaces caused by friction in certain areas of the weld surface and certain times during the weld process.

20 Claims, 15 Drawing Sheets ns, and an electronic controller which controls the phased
APPARATUS FOR LINEAR FRICTION WELDING This application is a 35 U.S.C. §371 National Stage Application of PCT/US2012/067940, filed on Dec. 5, 2012, which claims the benefit of U.S. Provisional Patent Application, Ser. No. 61/630,124 filed Dec. 5, 2011, the entirety of which is incorporated by reference herein.

This invention relates to an apparatus for linear friction welding, and in particular a linear friction welding apparatus having a vibrating assembly or assemblies, which simultaneously vibrates both work pieces along different weld axis during the weld process.

BACKGROUND AND SUMMARY OF THE INVENTION

Linear friction welding (LFW) is a process of joining two components which may be made from the same or different materials. The LFW process typically involves pressing the two components together under a large amount of force and rapidly vibrating the components with respect to one another to generate friction at the interface between the two components. The pressure and movement generate sufficient heat to cause the material at the interface to plasticize. Once the material at the interface begins to plasticize, the vibration is stopped and an increased force is applied. As the plasticized material of both components cools in this static condition, the components are bonded together and a weld is formed. While LFW is suitable in many applications, heretofore, LFW has not been practical for repair welds.

In certain embodiments, the linear friction welding (LFW) apparatus of this invention includes two vibrating assemblies, which simultaneously vibrate both work pieces along different weld axis within the plane of the weld interface during the weld process. The LFW apparatus allows both work pieces to be independently vibrated against one another along different weld axis to control and concentrate the application of thermal energy across the weld surfaces caused by friction in certain areas of the weld surface and during certain times during the weld process. Each vibrating assembly independently controls the amplitude and frequency of the vibration of its work piece relative to the other during the weld process, and also allows the vibration to instantly stop with no load on the work piece. In other embodiments, the linear friction welding (LFW) apparatus of this invention uses a vibrating assembly that moves one of the work pieces along a fixed orbit within the plane of the weld interface during the weld process.

The apparatus and method of the present invention may take form in various systems and components, as well as the arrangement of those systems and components. The above described features and advantages, as well as others, will become more readily apparent to those of ordinary skill in the art by reference to the following detailed description and accompanying drawings. The drawings are only for purposes of illustrating exemplary embodiments and are not to be construed as limiting the invention.

DESCRIPTION OF THE PREFERRED EMBODIMENT

Figure 1:
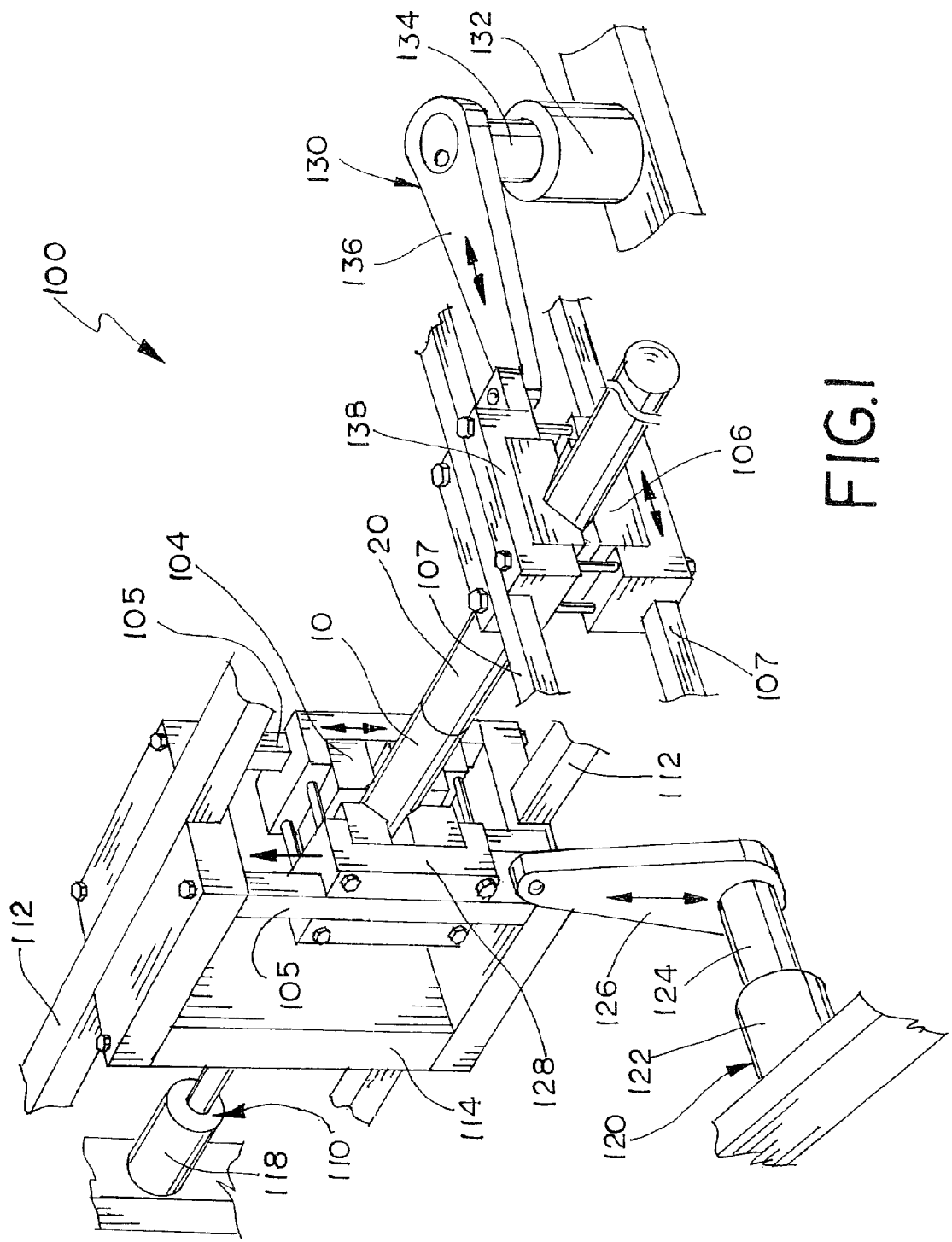
FIG. 1 is a simplified perspective view of an embodiment of the linear friction welding apparatus of this invention.

Referring now to the drawings, each embodiment of this linear friction welding (LFW) apparatus of this invention includes a vibrating assembly or assemblies, which vibrates one or both of two work pieces during the weld process. The vibrating assemblies of both embodiments of the LFW apparatus of this invention include an oscillation mechanism that embodies the teachings of the linear friction welding (LFW) apparatus developed by APCI, Inc. in South Bend, Ind. that are described in U.S. patent application Ser. No. 12/868,623 filed Aug. 25, 2010, which issued as U.S. Pat. No. 8,070,039 on Dec. 6, 2011. The oscillator mechanisms enable the LFW apparatus of this invention to control the amplitude, frequency and termination of the weld oscillation, as well as the weld and force pressures during the weld process. For simplicity of explanation herein, the particular components of the oscillation mechanisms, as well as their operation and advantage are not fully illustrated or described herein, but may be inferred by reference to the above identified U.S. patent applications and patents, which are incorporated herein. In certain embodiments, the oscillator mechanism may include a ram configured to vibrate along a welding axis, a cam follower operably connected to the ram, an eccentric including an eccentric outer periphery operably engaged with the cam follower, and an inner periphery, a first power shaft slidingly engaged with the eccentric, and a second power shaft eccentrically engaged with the inner periphery. In other embodiments, the oscillator mechanisms may include a ram configured to vibrate along a welding axis, a first power shaft operably connected to the ram and associated with a first eccentricity, a second power shaft operably connected to the ram and associated with a second eccentricity. The oscillator mechanism is controlled electronically by program instructions, and an electronic controller which controls the phased relationship between the first eccentricity and the second eccentricity such that the ram does not vibrate along the welding axis, establishes a first pressure between two components to be welded after controlling the phased relationship such that the ram does not vibrate, and modifies the phased relationship such that the ram vibrates along the welding axis after the first pressure has been established.

First Embodiment

Referring now to the drawings, FIG. 1 illustrates an embodiment of the linear friction welding (LFW) apparatus of this invention, which is designated as reference number 100. LFW apparatus 100 includes two mounting fixtures 104 and 106 that securely hold work pieces 10 and 20 during the weld process. As shown, work pieces 10 and 20 are elongated rods, but LFW apparatus 100 may be configured or adapted to weld any two work pieces regardless of size, configuration or composition. Likewise, mounting fixtures 104 and 106 may take any suitable form or configuration depending on the size, shape and configuration of the work pieces being welded in any particular application. Mounting fixture 104 is seated within a carriage 128 that rides on slides 105 to facilitate the transverse motion of work piece 10 along the first weld axis (the "X weld axis"). Similarly fixture 106 is seated within a carriage 138 that rides on slides 107 to facilitate the transverse motion of work piece 20 along a second weld axis (the "Y weld axis). LFW apparatus 100 further includes a press assembly 110 that applies the weld and forging pressures to work pieces 10 and 20 during the welding process. Press assembly 110 includes a hydraulic ram 118 that is operably connected to a carriage 114 that rides on slides 112. Carriage 114 supports slides 105 along with carriage 128 and mounting fixture 104. LFW apparatus 100 includes two vibrating assemblies 120 and 130. Each vibrating assembly 120 and 130 includes drive motors 122 and 132, oscillators 124 and 134, and drive arms 126 and 128, respectively. Drive arm 126 is operably connected to fixture 104 to vibrate work piece 10 along the X weld axis. Drive arm 136 is operably connected to fixture 106 to vibrate work piece 20 along the Y weld axis.

Both vibrating assemblies 120 and 130 of LFW apparatus 10 include an oscillators that embody the teachings of the linear friction welding (LFW) apparatus developed by APCI, Inc. in South Bend, Ind. that are described in U.S. patent application Ser. No. 12/868,623 filed Aug. 25, 2010, which issued as U.S. Pat. No. 8,070,039 on Dec. 6, 2011. The oscillators enable the LFW apparatus of this invention to control the amplitude, frequency and termination of the weld oscillation, as well as the weld and force pressures during the weld process. In certain embodiments, the oscillator mechanism may include a cam follower operably connected to the ram, an eccentric including an eccentric outer periphery operably engaged with the cam follower, and an inner periphery, a first power shaft slidingly engaged with the eccentric, and a second power shaft eccentrically engaged with the inner periphery. In other embodiments, the oscillator mechanisms may include a ram configured to vibrate along a welding axis, a first power shaft operably connected to the ram and associated with a first eccentricity, and a second power shaft operably connected to the ram and associated with a second eccentricity. The oscillators are coordinated by an electrical control using program instructions that control the phased relationship between the first eccentricity and the second eccentricity such that the ram does not vibrate along the welding axis, establishes a first pressure between two components to be welded after controlling the phased relationship such that the ram does not vibrate, and modifies the phased relationship such that the ram vibrates along the welding axis after the first pressure has been established. For simplicity of explanation herein, the particular components of the oscillators, as well as their operation and advantage are not fully illustrated or described herein, but may be inferred by reference to the above identified U.S. patent applications and patents, which are incorporated herein.

During the weld process, LFW apparatus 100 simultaneously vibrates both work pieces 10 and 20 while pressing the work pieces together under a weld pressure. Friction between the work pieces cause material at the weld surfaces to plasticize. When the vibration is terminated, the work pieces are pressed together under a forge pressure to set the weld interface.

Figure 2:
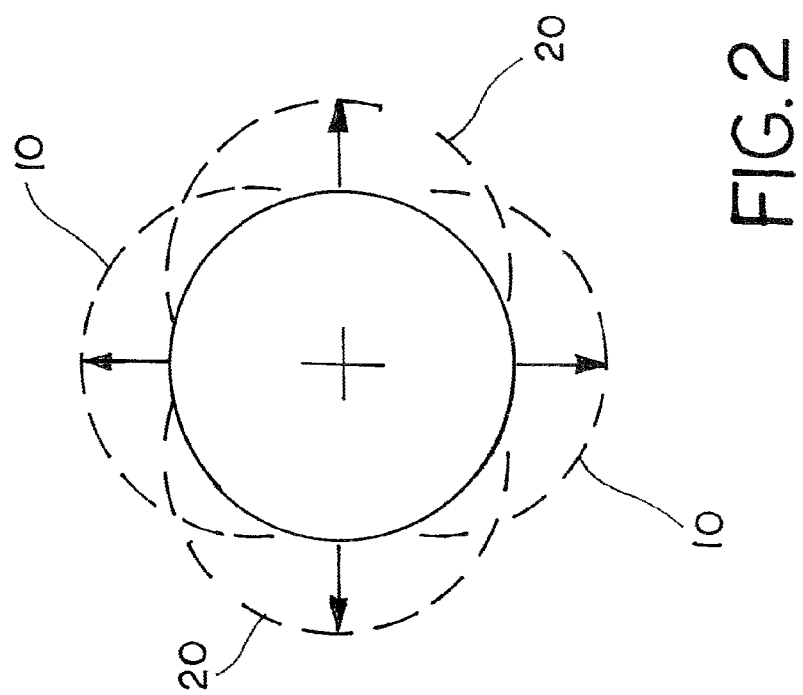
FIG. 2 is sectional view of the weld interface surface showing the relative movement of the work pieces of FIG. 1.
Figure 3:
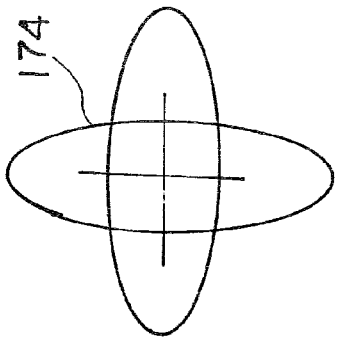
FIGS. 3-8 are simplified end views of the different types of relative movement of the work pieces created by of the linear friction welding apparatus of FIG. 1.
Figure 4:
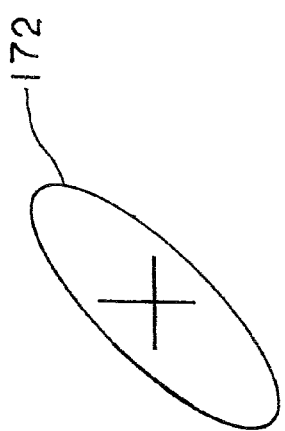
Figure 5:
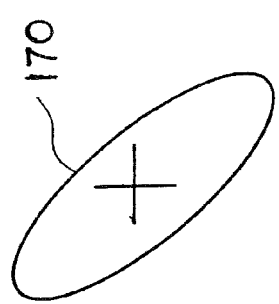
Figure 6:
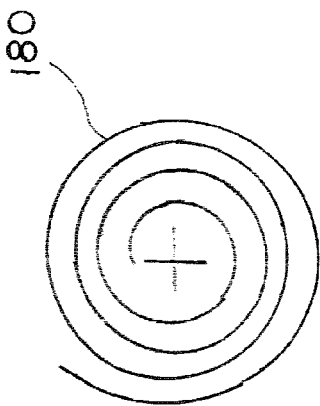
Figure 7:
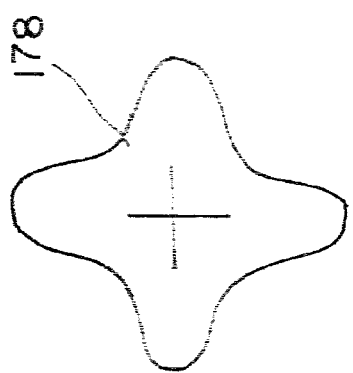
Figure 8:
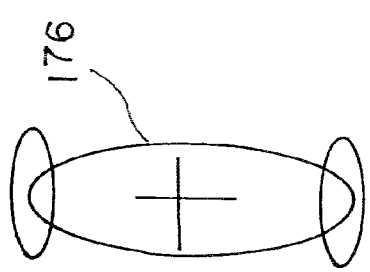
Figure 9:
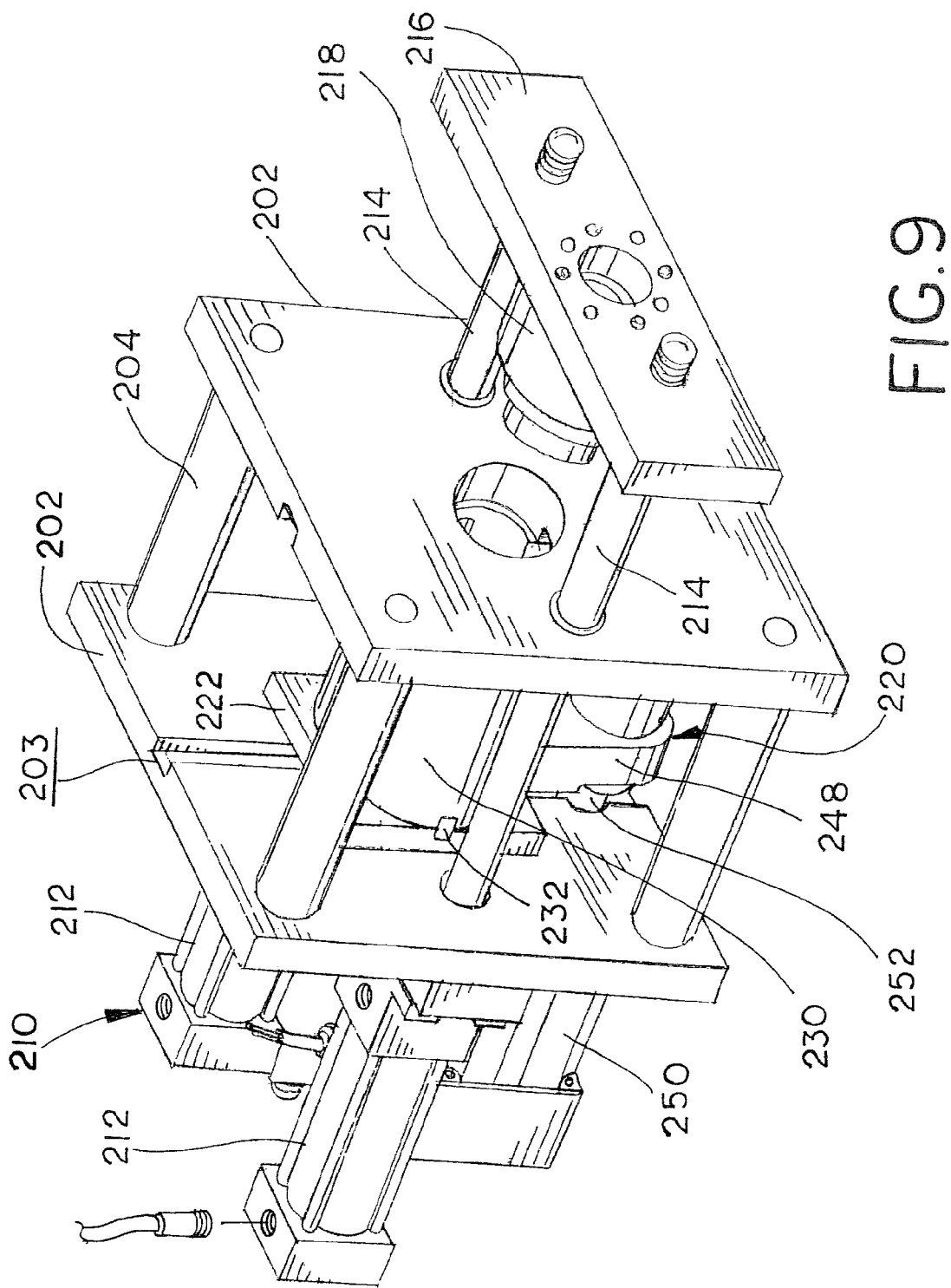
FIG. 9 is a simplified perspective view of a second embodiment of the linear friction welding apparatus of this invention.
Figure 10:
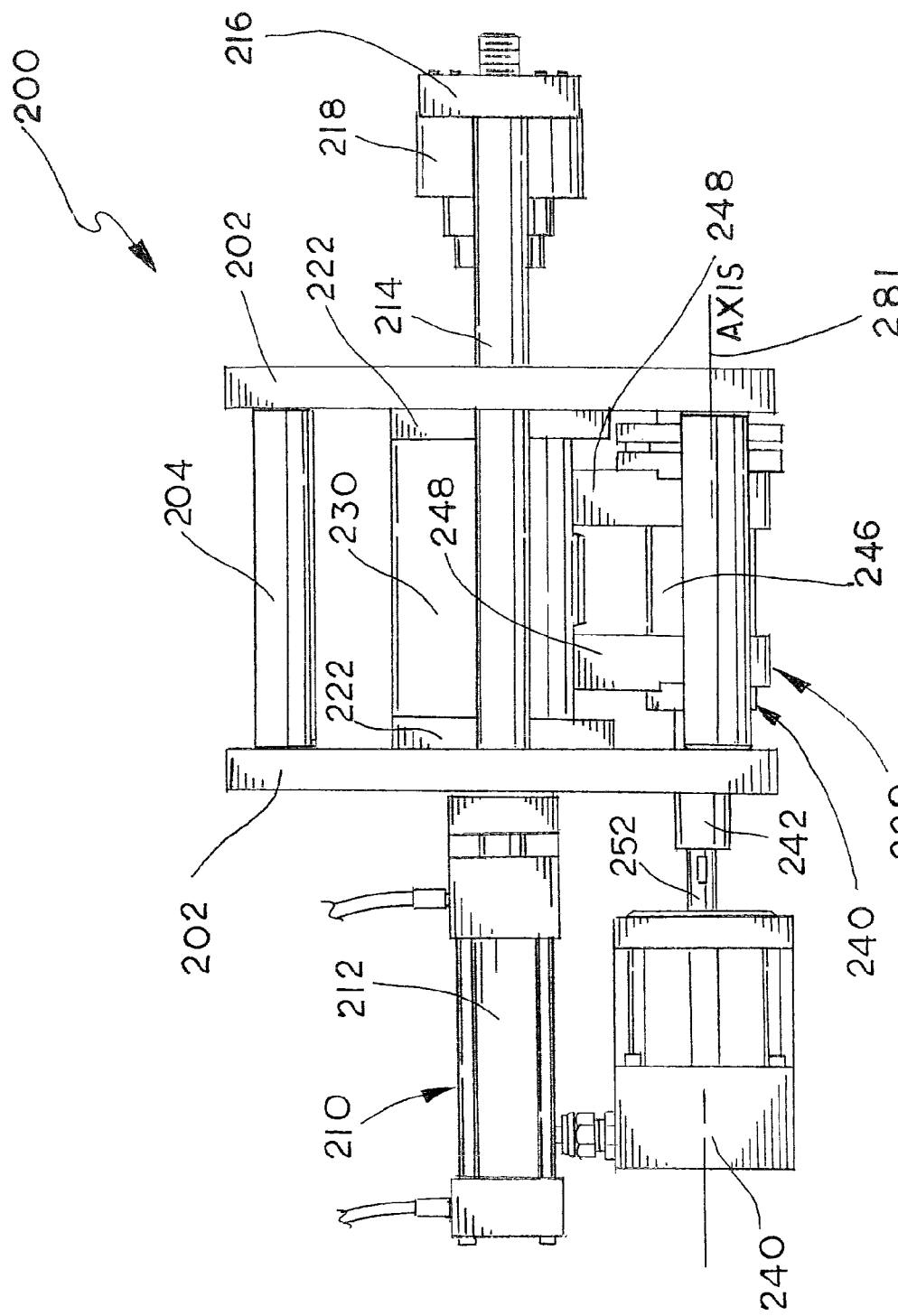
FIG. 10 is a side view of the linear friction welding apparatus of FIG. 9.
Figure 11:
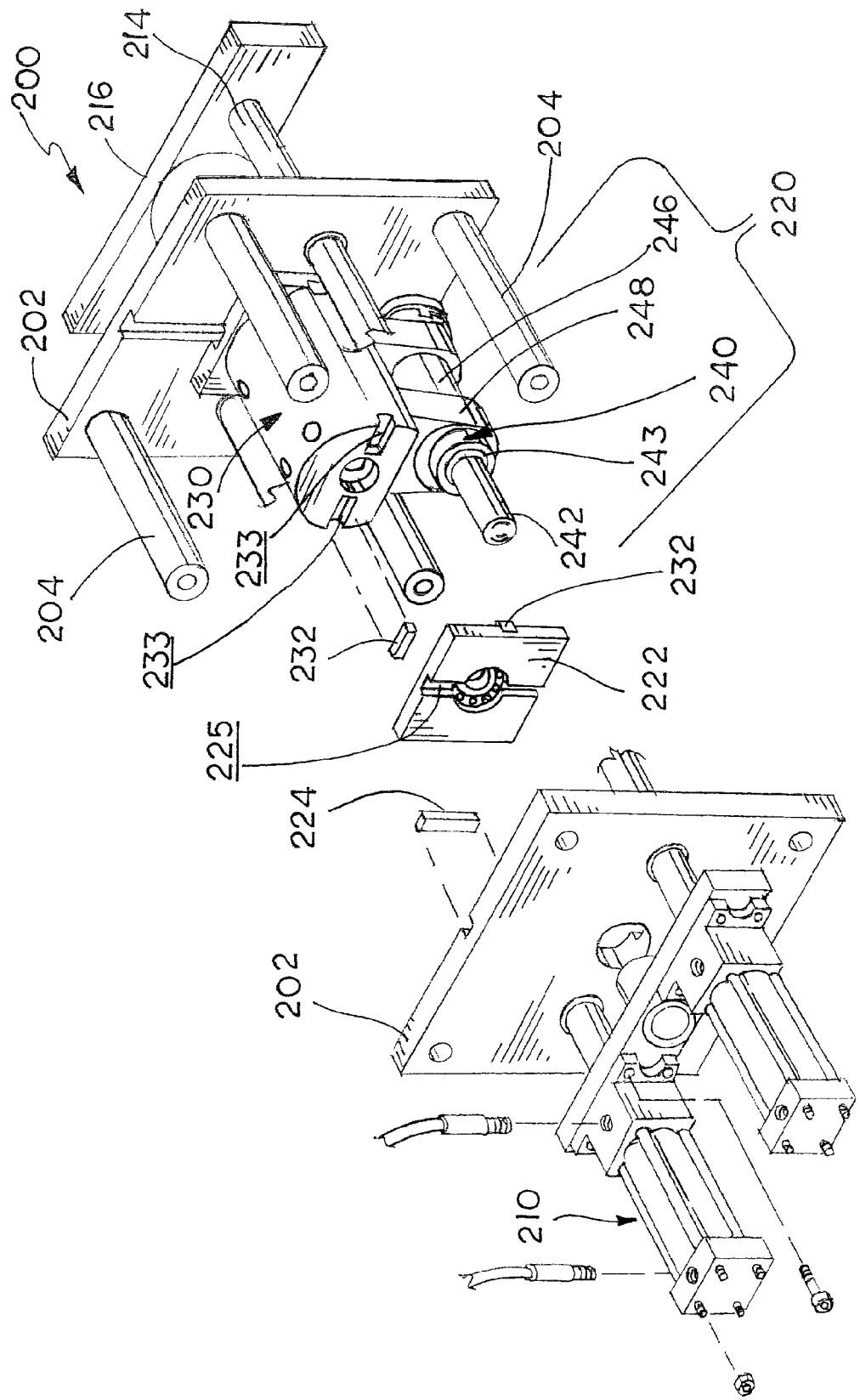
FIG. 11 is a partial exploded view of the linear friction welding apparatus of FIG. 9.
Figure 13:
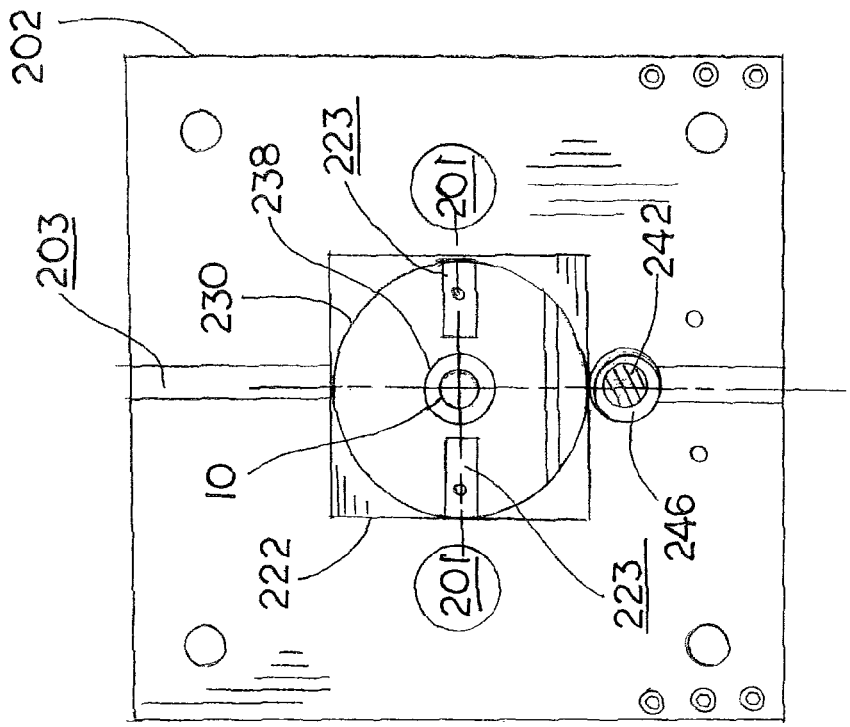
FIGS. 12-19 are simplified end sectional views of linear friction welding apparatus of FIG. 9 showing the position of the carriage at various axial orientation of the drive shaft.
Figure 12:
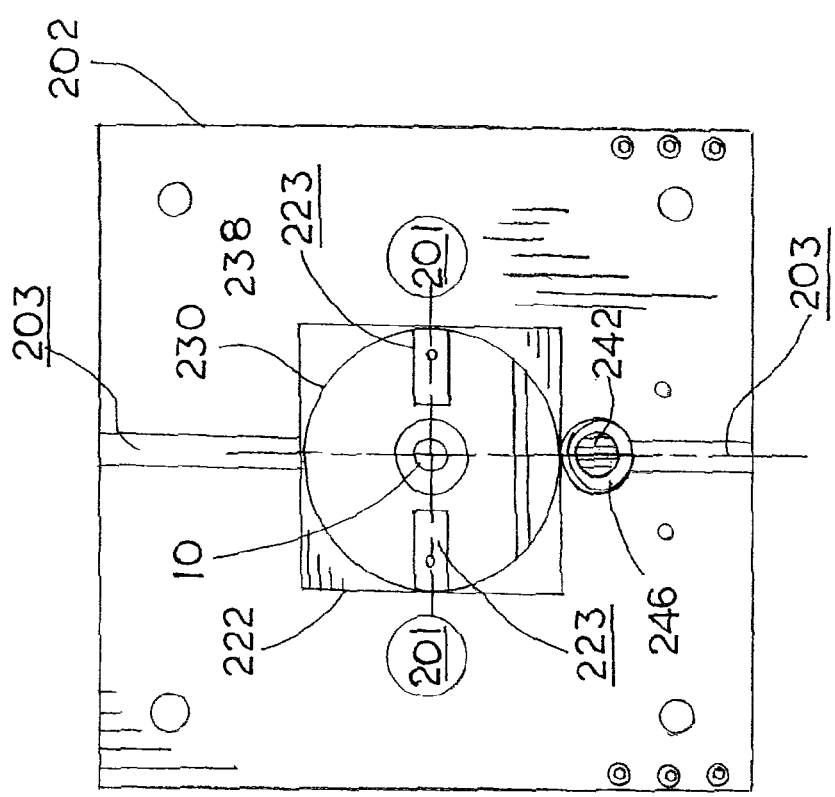
Figure 15:
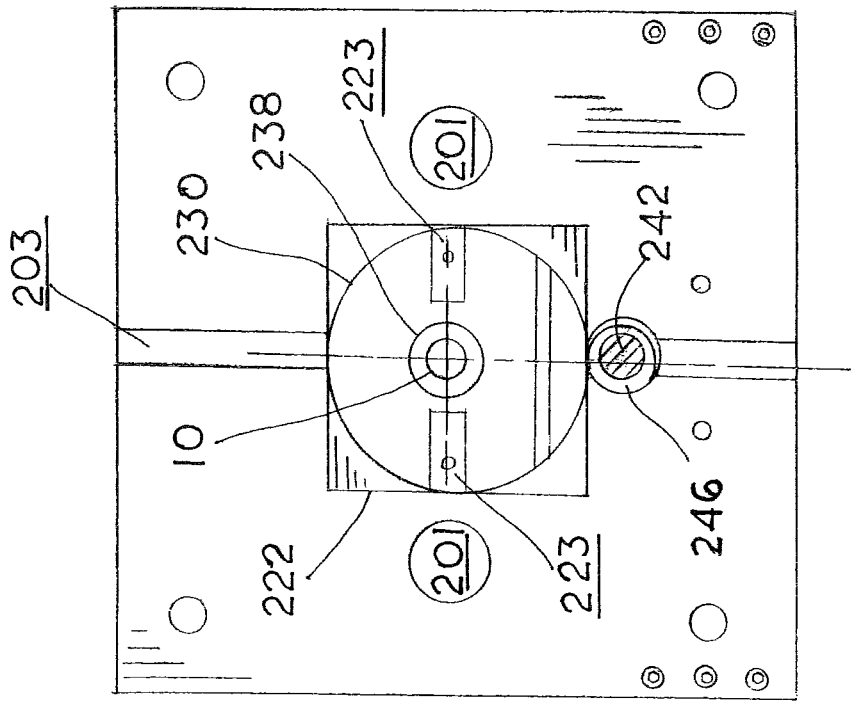
Figure 14:
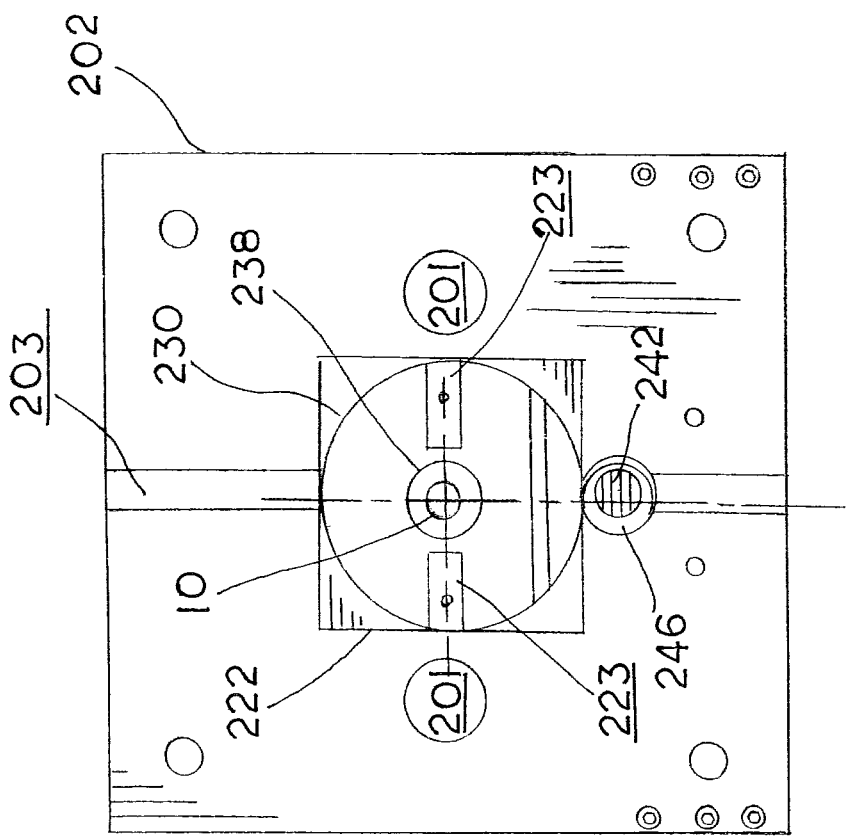
Figure 17:
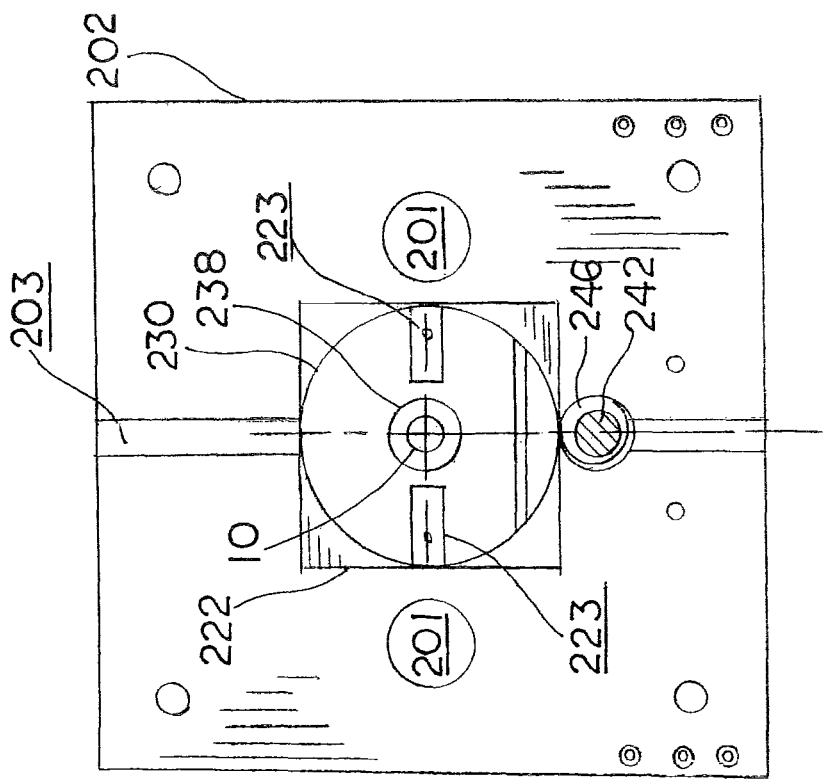
Figure 16:
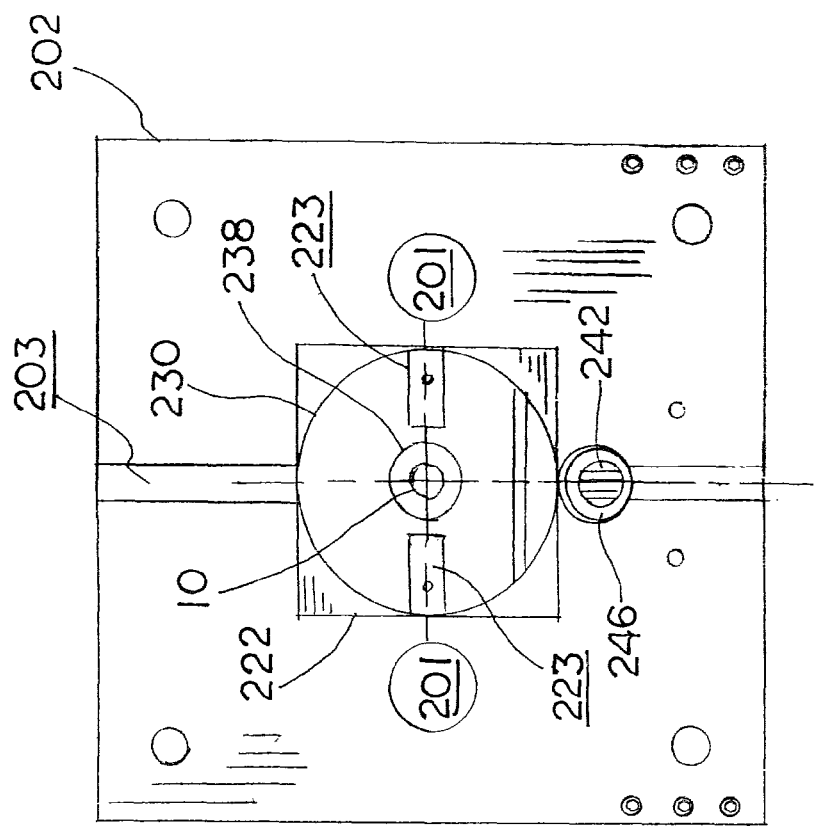
Figure 19:
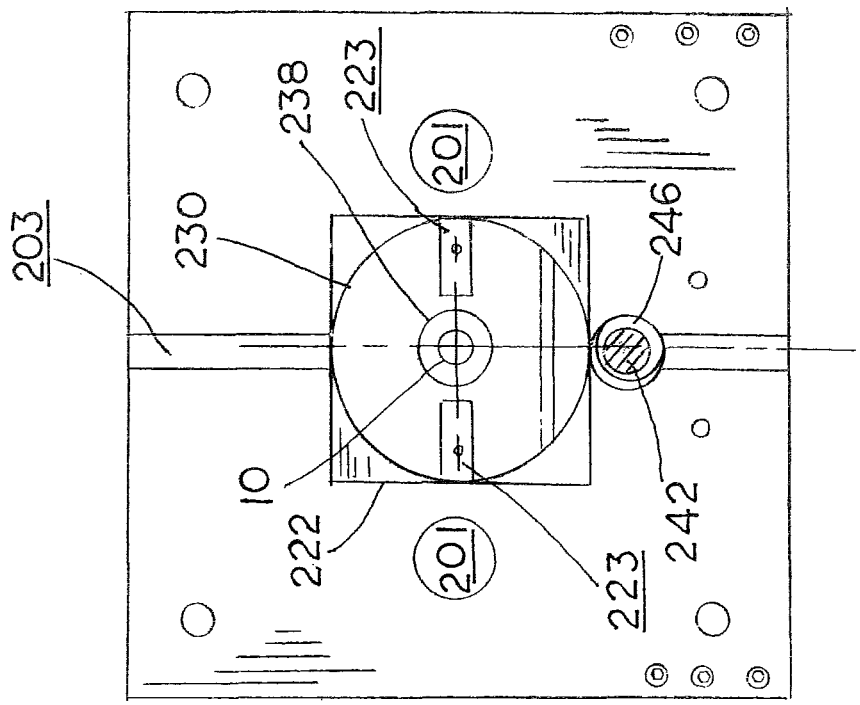
Figure 18:
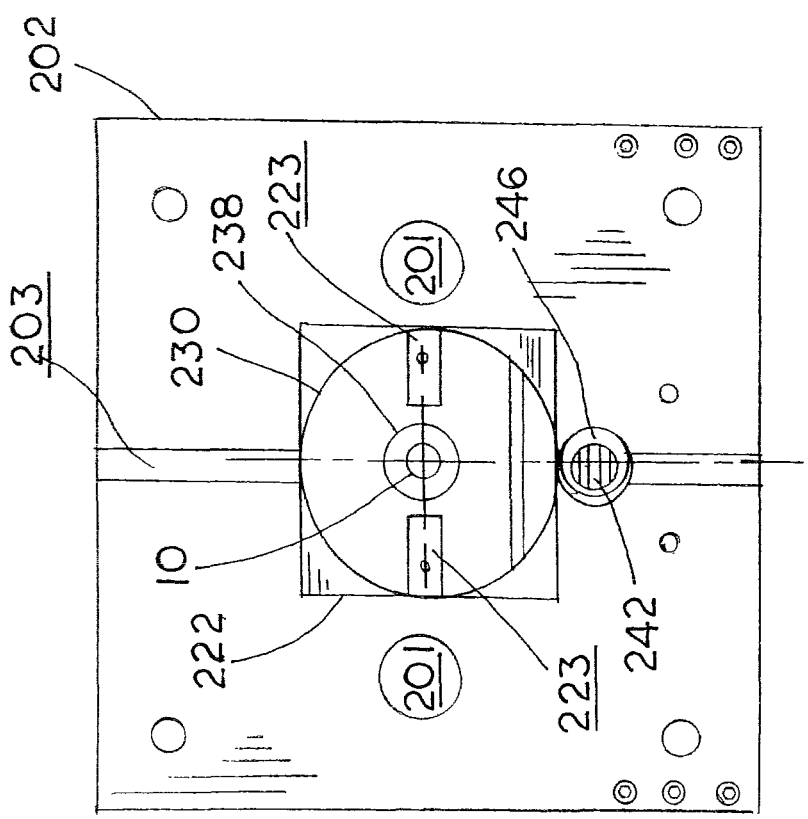
Figure 21:
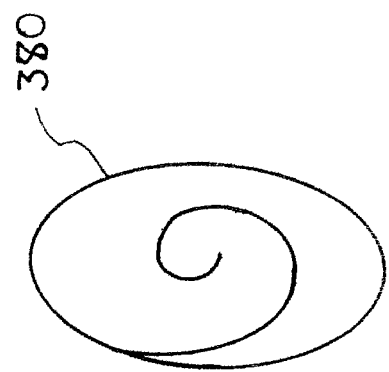
FIG. 21 is a simplified representation of the axial orbit of the moving work piece in the Z axis created by the linear friction apparatus of FIG. 22.
Figure 20:
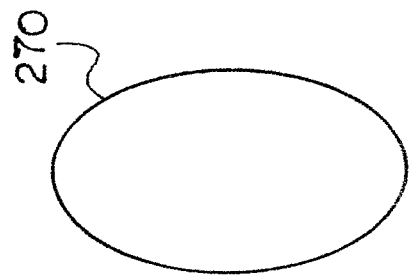
FIG. 20 is a simplified representation of the axial orbit of the moving work piece in the Z axis created by the linear friction apparatus of FIG. 9.
Figure 22:
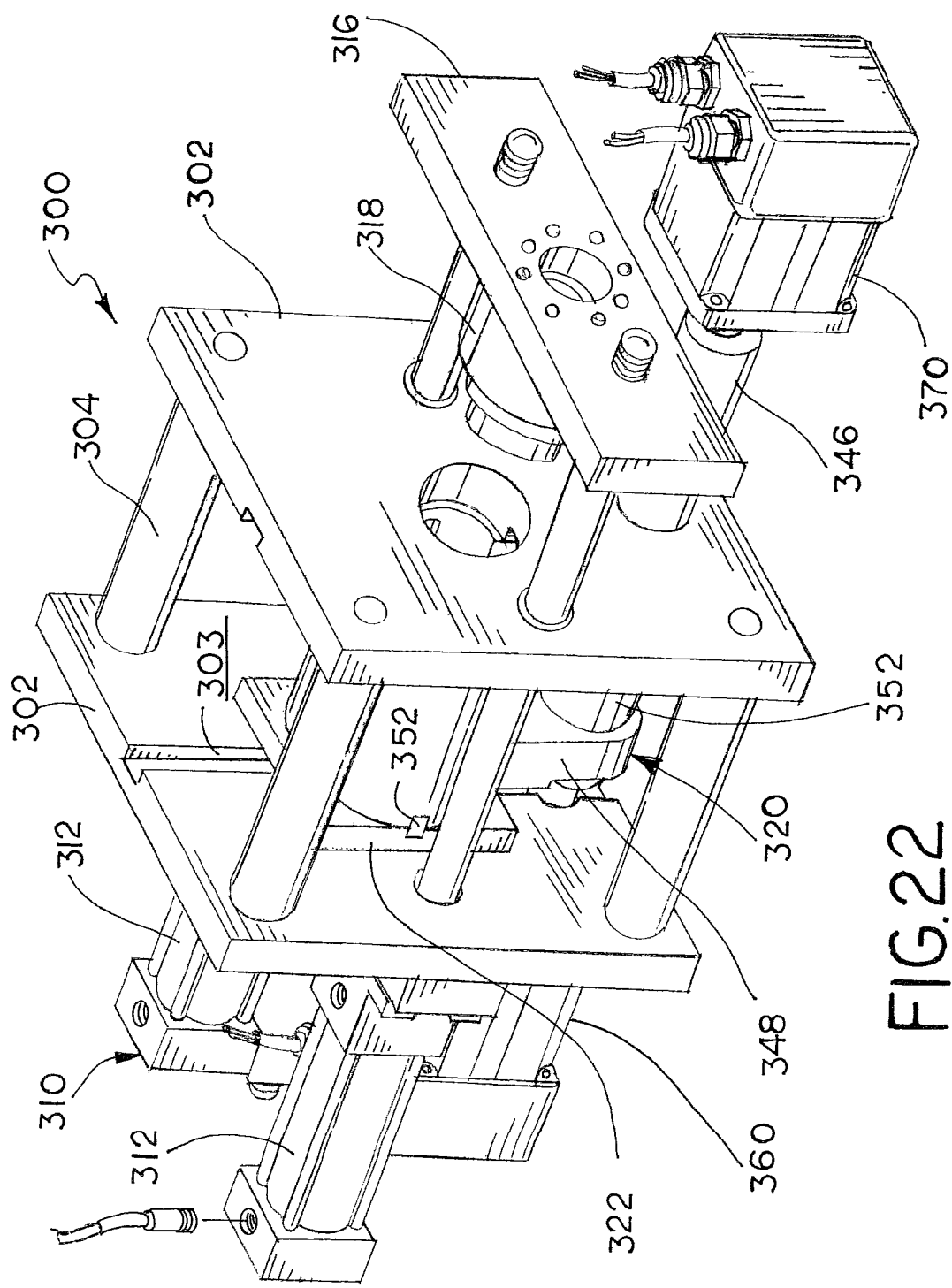
FIG. 22 is a simplified perspective view of a third embodiment of the linear friction welding apparatus of this invention.
Figure 23:
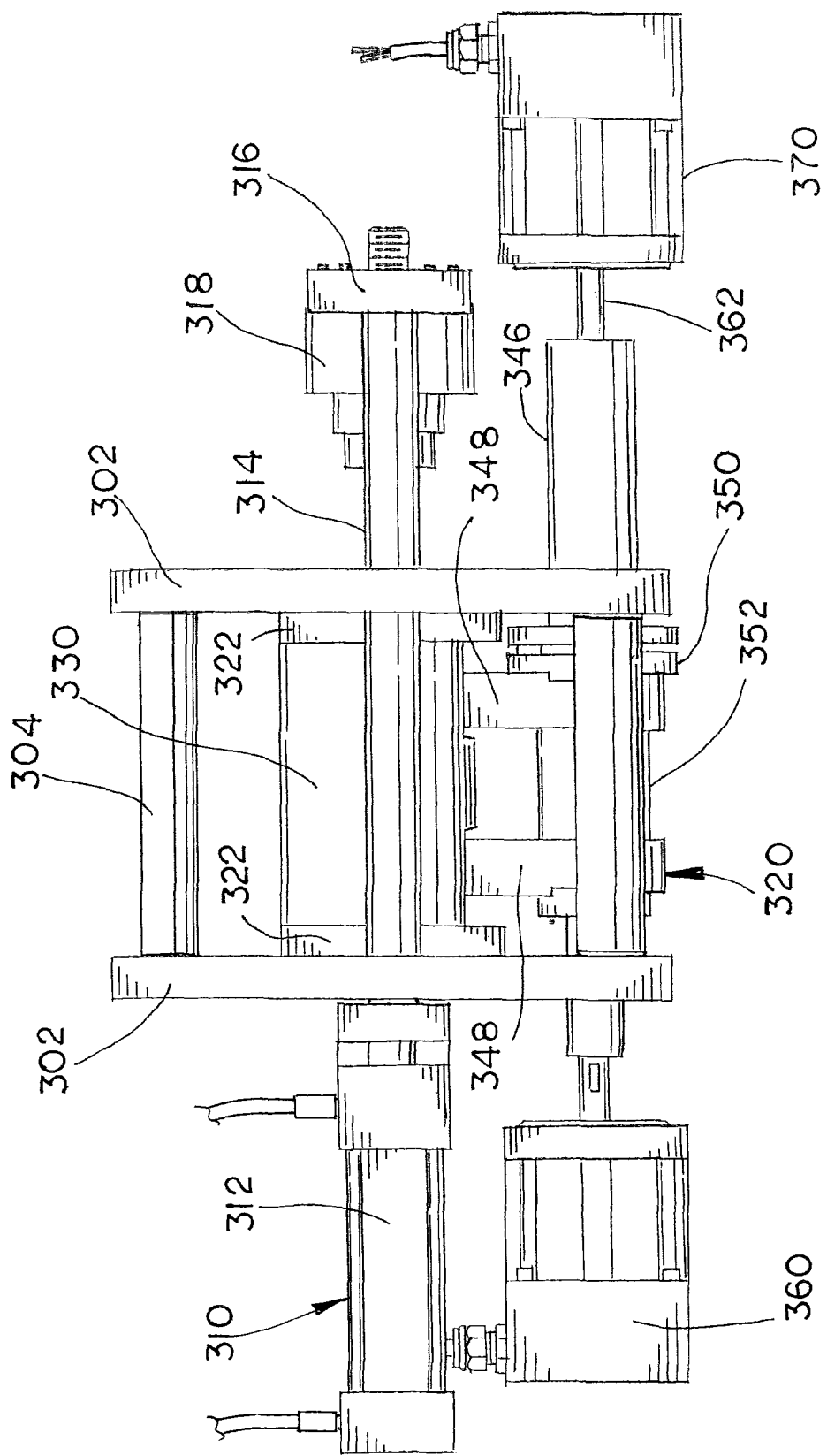
FIG. 23 is a side view of the linear friction welding apparatus of FIG. 22.
Figure 24:
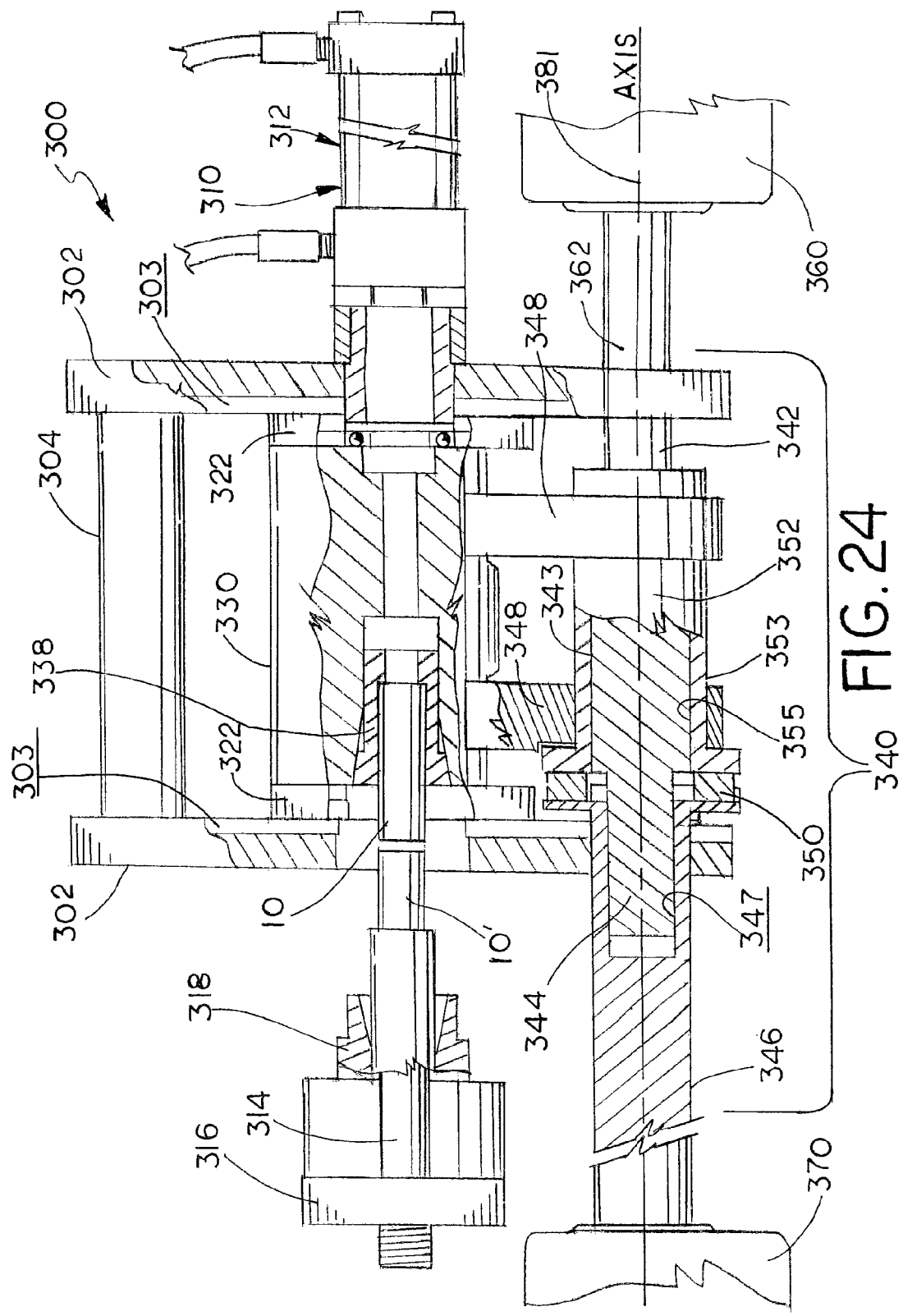
FIG. 24 is a side sectional view of the linear friction welding apparatus of FIG. 22 showing the work pieces spaced part.
Figure 25:
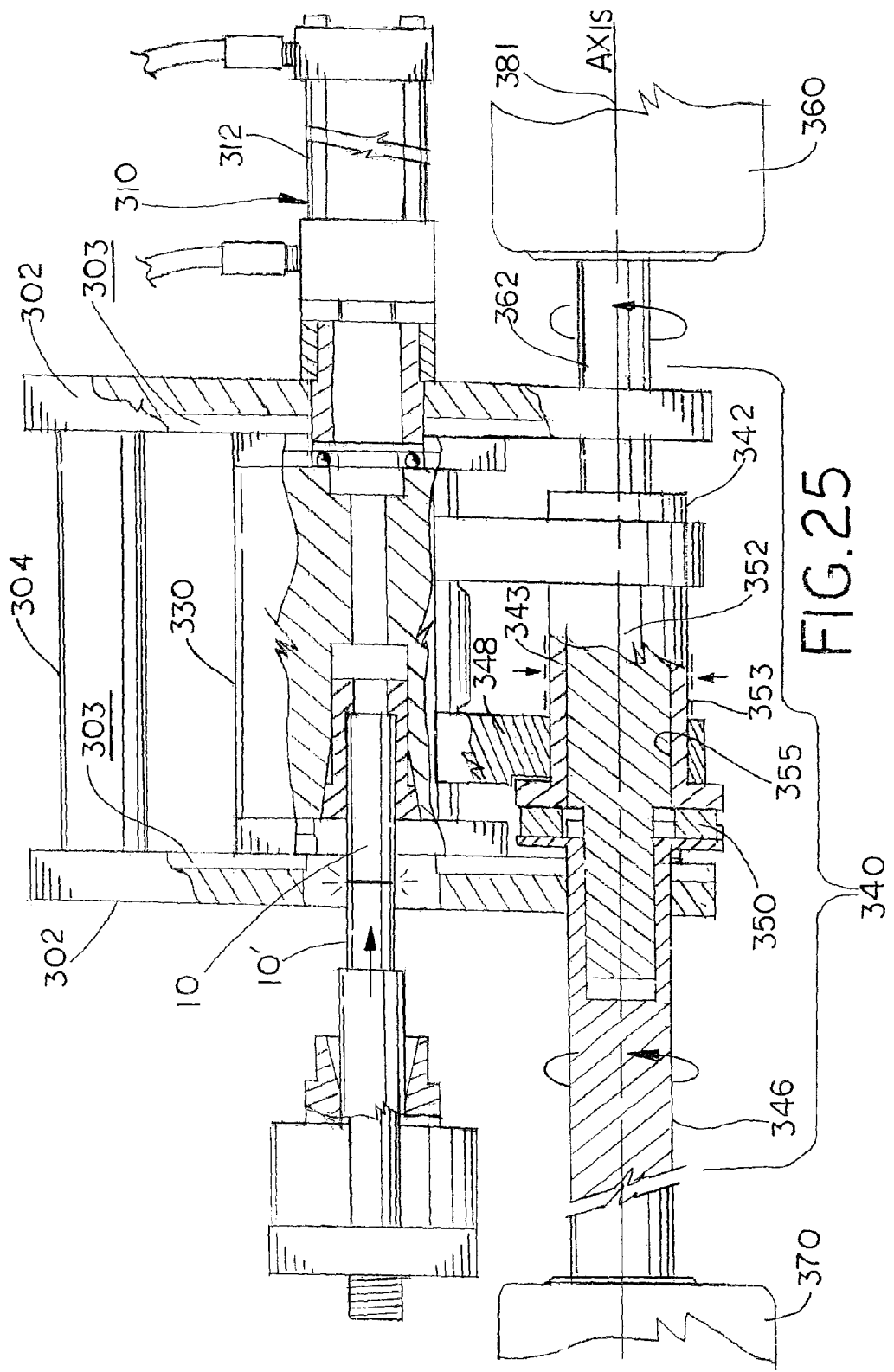
FIG. 25 is a side sectional view of the linear friction welding apparatus of FIG. 22 showing the work pieces pressed together.

FIG. 2 illustrates a sectional view of the weld interface of both work pieces 10 and 20 showing the relative movement of both work pieces during the welding process. LFW apparatus 100 vibrate work piece 10 along the X weld axis and work piece 20 along the Y axis so that both work pieces vibrate against one another while moving along different weld axis within the plane of the weld interface. The relative movement of the two work pieces can be selectively controlled by coordinating the operational relationship between vibrating assemblies 120 and 130. Because the amplitude and frequency of the oscillation of each vibrating assembly can be monitored and precisely controlled during the weld process, and the vibration of each work piece can be almost instantly terminated, the amplitudes, frequencies and relative position of the work pieces with respect to one another can be controlled to selectively concentrate thermal energy at certain areas of the weld surfaces and at certain times during the weld process. As shown in FIG. 2, the X and Y weld axis are normal to one another (perpendicular), but need only lie in the plane of the weld interface. The angular orientation of the X and Y weld axis within the plane of the weld interface may also be selected to generate the thermal energy across the weld surfaces in order to produce the desired weld profile. FIGS. 3-8 illustrate examples of the relative movement of the work piece in the plane of the weld interface (Z axis) which can be generated by LFW apparatus 100. FIGS. 3 and 4 show the relative movement in elliptical orbits 170 and 172. FIG. 5 shows the relative movement oscillating between two elliptical orbits 174. FIG. 6 shows the relative movement oscillating between a three elliptical orbits 176. FIG. 7 shows the relative movement around a cruciform shape orbit 178. FIG. 8 shows the relative movement around a spiral shaped orbit 180.

Second Embodiment

FIGS. 9-21 illustrate a second embodiment of the linear friction welding (LFW) apparatus of this invention, which is designated as reference number 200. Rather than vibrating each work piece along different axis within the plane of the weld interface as with LFW apparatus 100, LFW apparatus 200 moves one of the work pieces along an fixed orbit within the plane of the weld interface during the weld process.

LFW apparatus 200 includes a press assembly 210 and a vibrating assembly 2 mounted to a table frame (not shown). The table frame includes a pair of spaced upright end plates 202 connected by traverse support rods 204. Press assembly 210 includes a pair of hydraulic rams 212, which pulls the work pieces 10' against work piece 10 under the desired force pressure. The cylinder housing of both rams 212 are mounted to end plate 202 so that their extensible shafts 214 extend through aligned bores 201 in ends plates 202. A cross member 216 connects the ends of ram shafts 214 and supports a fixture assembly 216 that holds work piece 10. Fixture assembly 216 may take any suitable form or configuration for securely holding any desired work piece.

Vibrating assembly 220 includes a carriage 230, a cam assembly 240, and a motor 250. Carriage 230 includes an internal work piece fixture 238, which may take any suitable form or configuration for securing and holding any desired work piece. Carriage 230 is shiftably disposed between two slide plates 222, which acts as a modified Oldham coupling. Carriage 230 slides horizontally relative to slide plates 222 with a pair of keys 232 shiftably disposed within horizontal races 233 and 223 formed in the ends of carriage 230 and the inner face of slide plates 222 respectively. Similarly, slide plates 222 slide vertically against end plates 202 with a pair of keys 224 shiftably disposed in vertical races 203 and 225 formed in the inner face of end plates 202 and the outer face of slide plates 222.

Cam assembly 240 is disposed between end plates 202 and 204 and a pair of slide plates 222 in a modified Oldham coupling arrangement. Cam assembly 240 includes a shaft 242 having an eccentric portion 243 journaled within an eccentric 246 along with bearings (not shown). Eccentric 246 and accompanying bearings are embedded between rams 248, which are operably connected to carriage 230. Shaft 242 is coupled with the motor 250 by drive shaft 252 and rotates about an axis of rotation 281. Cam assembly 240 transfers the rotation of drive shaft 252 into vertical oscillation of rams 248, which lift carriage 230. The shiftable interconnection between carriage 230, slide plates 222 and the fixed end plate 202 functions as a modified Oldham coupling and creates an elliptical motion 270 (FIG. 20) of carriage 230 and work piece 10. FIGS. 12-19 illustrate the various positions of carriage 230 relative to end plate 202 at forty-five degree (45°) intervals of drive shaft 24 starting at top dead center in FIG. 12.

Third Embodiment

FIGS. 21-25 illustrate a third embodiment of the linear friction welding (LFW) apparatus of this invention, which is designated as reference number 300. LFW apparatus 300 is similar in design and function to LFW 200, except that the vibrating assembly employs a second motor and modified Oldham couple to vary the vertical travel of carriage 330 following the teachings of U.S. Pat. No. 8,070,039, which is incorporated herein by reference.

Again, LFW 300 includes a press assembly 310 and a vibrating assembly 320 mounted to a table frame (not shown). The table frame includes a pair of spaced upright end plates 302 connected by traverse support rods 304. Press assembly 30 includes a pair of hydraulic rams 312, which pulls the work pieces 10 and 10' together under the desired force pressure. The cylinder housing of both rams 312 are mounted to end plate 302 so that their extensible shafts 314 extend through aligned bores 301 in end plates 302. A cross member 316 connects the ends of ram shafts 314 and supports a fixture assembly 216 that holds work piece 10'.

Vibrating assembly 320 includes a carriage 330, a cam assembly 340, and motors 360 and 370. Carriage 330 includes an internal work piece fixture 338, which may take any suitable form or configuration for securing and holding any desired work piece. Again, carriage 330 is shiftably disposed between two slide plates 322, which acts as a modified Oldham couple. Carriage 330 slides horizontally relative to slide plates 322 with a pair of keys 332 shiftably disposed within horizontal races 333 and 323 formed in the ends of carriage 330 and the inner face of slide plates 322 respectively. Similarly, slide plate 322 slides vertically against end plates 302 with a pair of keys 324 shiftably disposed in vertical races 303 and 325 formed in the inner face of end plates 302 and the outer face of slide plates 322.

Cam assembly 30 includes a first power shaft 342, an outer power shaft 346, a coupler 350, an eccentric 352, and rams 348. First power shaft 342 is coupled with the motor 360 by drive shaft 362 and rotates about an axis of rotation 381. First power shaft 342 includes an eccentric portion 343 and a projection 344. Second power shaft 346 is coupled with the motor 370 and also rotates about the axis of rotation 381. First power shaft 342 in second power shaft 346 includes a cavity 347 configured to rotatably receive the projection 344. Rotatable engagement of the projection 344 within the cavity 347 keeps both the inner and outer power shafts 342 and 346 coaxial with the axis of rotation 370. The coupler 350 is a modified Oldham coupler, which is operably engaged with eccentric 352 (see FIG. 4). Eccentric 352 further includes an outer eccentric periphery 353 and an inner periphery 357 defining a through-bore, which is sized to rotationally receive the eccentric portion 343 of first shaft 342. The outer eccentric periphery 253 defines a diameter that is closely fit within the inner diameter of the rams 348.

Again, the shiftable interconnection between carriage 330, slide plates 322 and the fixed end plate 302 functions as a modified Oldham coupling and creates an elliptical motion 380 (FIG. 21) of work piece 10; however the use of a second Oldham coupling arrangement in cam assembly 240 allows LFW 300 to selectively spiral into and out of the elliptical motion, by changing the relative phase position of power shafts 342 and 346. The configuration, function and control of cam assembly 350 with the Oldham coupling mechanism follows the teachings of U.S. Pat. No. 8,070,039, which is incorporated herein by reference.

The embodiments of the present invention herein described and illustrated are not intended to be exhaustive or to limit the invention to the precise form disclosed. They are presented to explain the invention so that others skilled in the art might utilize its teachings. The embodiment of the present invention may be modified within the scope of the following claims.

I claim:

1. A linear friction welding system comprising:
    a first welding component support member configured to hold a first work piece;
    a second welding component support member configured to hold a second work piece;
    a vibrating assembly including a first power shaft operably connected to the first welding component support and configured to move the first work piece relative to the second work piece in a curved path within a plane of a weld interface; and
    a press assembly operably connected to the second welding component support member and configured to move the first welding component support member along a press axis orthogonal to the plane of the weld interface, wherein the first power shaft is spaced apart from the press axis.

2. The linear friction welding system of claim 1 wherein the vibrating assembly includes:
    a carriage shiftably mounted to a frame for movement along a first axis and a second axis which is orthogonal to the first axis and intersects the plane of the weld interface;
    a cam assembly operably connected to the carriage; and
    a motor operably connected to the cam assembly through the first power shaft.

3. The linear friction welding system of claim 2, wherein the cam assembly further includes:
    a ram;

a cam follower operably connected to the ram; and an eccentric having an eccentric outer periphery operably engaged with the cam follower, and wherein the first power shaft is slidingly engaged with the eccentric.

4. The linear friction welding system of claim 3 wherein the first power shaft is directly connected to the motor.

5. The linear friction welding system of claim 3 wherein:

the cam assembly includes a second power shaft;

the eccentric includes an inner periphery; and the second power shaft is engaged with the inner periphery.

6. The linear friction welding system of claim 5 wherein the vibrating assembly includes a second motor operably connected to the second power shaft.

7. The linear friction welding system of claim 5 wherein the second power shaft is eccentric shaped.

8. The linear friction welding system of claim 1 wherein the curved path is fixed within the plane of the weld interface.

9. A linear friction welding system comprising:

a press assembly for pressing a first work piece against a second work piece along a press axis under selective loads;

a first welding component support member configured to hold the first work piece;

a first vibrating assembly including a first power shaft not aligned with the press axis and operably connected to the first welding component support member and configured to vibrate the first welding component support such that the first work piece vibrates along a first weld axis;

a second welding component support member configured to hold the second work piece; and a second vibrating assembly operably connected to the second welding component support member and configured to vibrate the second welding component support such that the second work piece vibrates along a second weld axis, the first weld axis and the second weld axis defining a plane orthogonal to the press axis.

10. The linear friction welding system of claim 9 wherein the first welding component support member is movable along the press axis by the press assembly.

11. The linear friction welding system of claim 9, wherein the first vibrating assembly includes:

a first carriage movably mounted to a frame for movement along a first axis and along a second axis which is orthogonal to the first axis and intersects the plane;

a first cam assembly operably connected to the first carriage; and a first motor operably connected to the first cam assembly through the first power shaft.

12. The linear friction welding system of 11, wherein the first cam assembly further includes:

a first ram;

a first cam follower operably connected to the first ram; and a first eccentric having a first eccentric outer periphery operably engaged with the first cam follower, and wherein the first power shaft is slidingly engaged with the first eccentric.

13. The linear friction welding system of claim 12 wherein:

the first cam assembly includes a second power shaft;

the first eccentric includes a first inner periphery; and the second power shaft is engaged with the first inner periphery.

14. The linear friction welding system of claim 13 wherein the first vibrating assembly includes a second motor operably connected to the second power shaft.

15. The linear friction welding system of claim 14 wherein the second power shaft has an eccentric shape.

16. The linear friction welding system of claim 14, wherein the second vibrating assembly includes:

a second carriage movably mounted to the frame for movement along a third axis which is parallel the plane;

a second cam assembly operably connected to the second carriage; and a third motor operably connected to the second cam assembly through a second power shaft, the second power shaft not aligned with the press axis.

17. The linear friction welding system of 16, wherein the second cam assembly further includes:

a second ram;

a second cam follower operably connected to the second ram; and a second eccentric having a second eccentric outer periphery operably engaged with the second cam follower, and wherein the second power shaft is slidingly engaged with the second eccentric.

18. The linear friction welding system of claim 17, further comprising:

a first pair of slides operably engaged with the first carriage, the first slides configured to guide the first carriage along the first axis.

19. The linear friction welding system of claim 18, further comprising:

a second pair of slides operably engaged with the second carriage, the second slides configured to guide the second carriage along the third axis.

20. The linear friction welding system of claim 9 wherein the first power shaft is parallel to the press axis.

* * * * *